US012602275B2

(12) United States Patent
Roberts

(10) Patent No.: US 12,602,275 B2
(45) Date of Patent: Apr. 14, 2026

(54) SYSTEM-LEVEL COORDINATED RESILIENCE

(71) Applicant: Micron Technology, Inc., Boise, ID (US)

(72) Inventor: David Andrew Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 48 days.

(21) Appl. No.: 18/424,306

(22) Filed: Jan. 26, 2024

(65) Prior Publication Data

US 2025/0245086 A1    Jul. 31, 2025

Related U.S. Application Data

(60) Provisional application No. 63/442,666, filed on Feb. 1, 2023.

(51) Int. Cl.
*G06F 11/00* (2006.01)
*G06F 11/07* (2006.01)
(Continued)

(52) U.S. Cl.
CPC ...... *G06F 11/0772* (2013.01); *G06F 11/0727* (2013.01); *G06F 11/141* (2013.01); *G06F 11/167* (2013.01)

(58) Field of Classification Search
CPC .................................................. G06F 11/0727
See application file for complete search history.

(56) References Cited

U.S. PATENT DOCUMENTS 6,493,843 B1 * 12/2002 Raynham ............ G06F 11/1012
714/763
11,188,457 B1 * 11/2021 Kuzmin .................. G06F 3/061
(Continued)

FOREIGN PATENT DOCUMENTS

WO        2024163294        8/2024

OTHER PUBLICATIONS

L. Yuan, H. Liu, P. Jia and Y. Yang, "Reliability-Based ECC System for Adaptive Protection of NAND Flash Memories," 2015 Fifth International Conference on Communication Systems and Network Technologies, Gwalior, India, 2015, pp. 897-902 (Year: 2015).*
(Continued)

*Primary Examiner* — Bryce P Bonzo
*Assistant Examiner* — Gabriella Kanani Shelton
(74) *Attorney, Agent, or Firm* — Schwegman Lundberg & Woessner, P.A.

(57)            ABSTRACT

A method performed by a distributed computing system is described. The distributed computing system includes one or more host nodes and a main memory connected to the one or more host nodes by a fabric interconnect. The method includes receiving, by an application program interface (API) of a host node, a function call from an application of a host device, the function call including a pointer to a memory object and a level of reliability for operations involving the memory object; and configuring system reliability features included in one or both of the fabric interconnect and memory devices of the main memory according to the level of reliability in the function call.

17 Claims, 7 Drawing Sheets

(51) Int. Cl.
     *G06F 11/14*          (2006.01)
     *G06F 11/16*          (2006.01)

(56)                    References Cited

U.S. PATENT DOCUMENTS

| | | | |
|---|---|---|---|
| 11,698,878 B1 * | 7/2023 | Douglis | G06F 13/385 |
| | | | 710/313 |
| 12,287,985 B2 * | 4/2025 | Li | G06F 3/0673 |
| 2003/0046615 A1 * | 3/2003 | Stone | H04L 67/1034 |
| | | | 714/E11.02 |
| 2003/0188032 A1 | 10/2003 | Solomon et al. | |
| 2007/0220307 A1 * | 9/2007 | Ishii | G06F 11/1076 |
| | | | 714/E11.02 |
| 2009/0254552 A1 | 10/2009 | Vinberg et al. | |
| 2019/0243953 A1 * | 8/2019 | Fargo | G06F 21/602 |
| 2021/0117242 A1 | 4/2021 | Van De Groenendaal et al. | |
| 2021/0286752 A1 | 9/2021 | Modukuri et al. | |
| 2021/0294494 A1 | 9/2021 | Kachare et al. | |
| 2022/0029641 A1 * | 1/2022 | Kale | G06F 11/1068 |
| 2022/0300175 A1 * | 9/2022 | Bert | G06F 3/0655 |
| 2023/0104509 A1 * | 4/2023 | Tseng | G06F 11/108 |
| | | | 711/114 |
| 2025/0045165 A1 * | 2/2025 | Brewer | G06F 11/1076 |

OTHER PUBLICATIONS

"International Application Serial No. PCT US2024 013176, International Search Report mailed May 31, 2024", 3 pages.
"International Application Serial No. PCT US2024 013176, Written Opinion mailed May 31, 2024", 4 pages.

* cited by examiner

100

300

MEMORY DEVICE — 114

CONTROLLER — 118

328

FABRIC INTERFACE

ERROR DETECTION ENGINE — 330

CHIPKILL CONTROLLER — 332

326

MEMORY DIE INTERFACE

130-A
MEMORY DIE

130-B
MEMORY DIE

130-N-1
MEMORY DIE

130-N
MEMORY DIE

112
FABRIC INTERCONNECT

RAID CONTROLLER — 334

FABRIC MANAGER — 336

104
HOST NODE

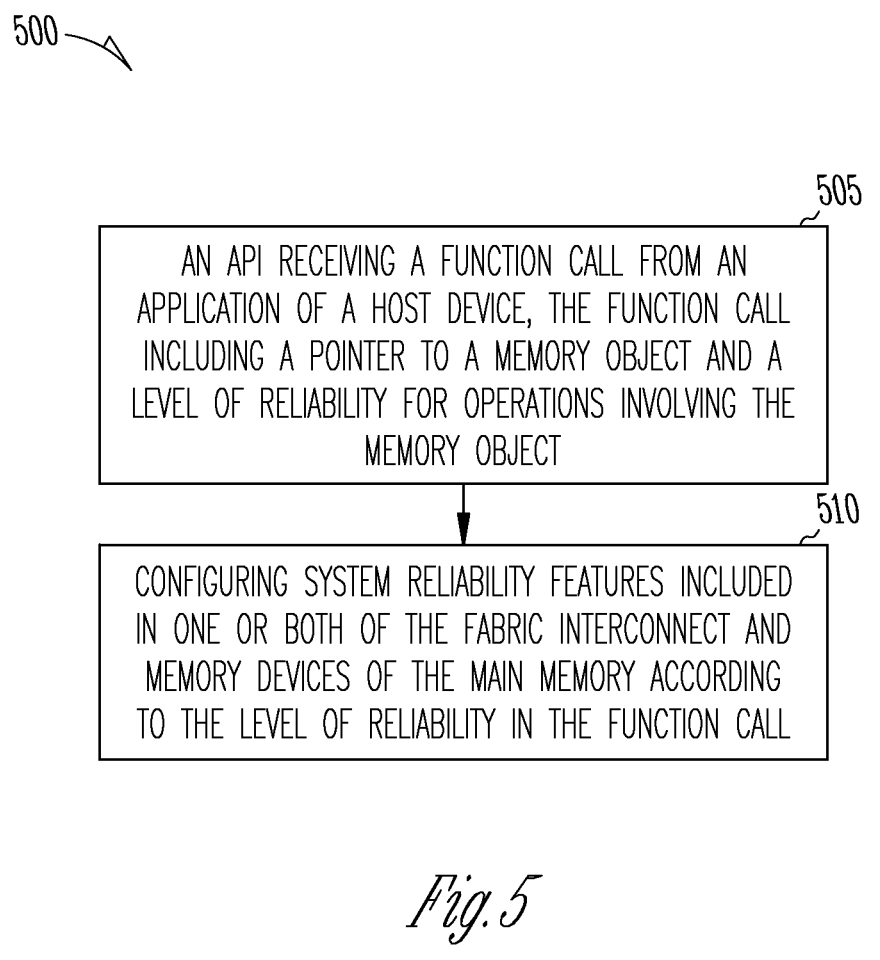

500 —∿

505

AN API RECEIVING A FUNCTION CALL FROM AN
APPLICATION OF A HOST DEVICE, THE FUNCTION CALL
INCLUDING A POINTER TO A MEMORY OBJECT AND A
LEVEL OF RELIABILITY FOR OPERATIONS INVOLVING THE
MEMORY OBJECT

510

CONFIGURING SYSTEM RELIABILITY FEATURES INCLUDED
IN ONE OR BOTH OF THE FABRIC INTERCONNECT AND
MEMORY DEVICES OF THE MAIN MEMORY ACCORDING
TO THE LEVEL OF RELIABILITY IN THE FUNCTION CALL

*Fig. 5*

SYSTEM-LEVEL COORDINATED RESILIENCE

PRIORITY APPLICATION

This application claims the benefit of priority to U.S. Provisional Application Ser. No. 63/442,666, filed Feb. 1, 2023, which is incorporated herein by reference in its entirety.

TECHNICAL FIELD

Embodiments of the disclosure relate generally to distributed computing systems that include fabric attached memory and more specifically to systems and methods to manage reliability features of the system to optimize operation of distributed computing systems.

BACKGROUND

Memory devices for computers or other electronic devices may be categorized as volatile and non-volatile memory. Volatile memory requires power to maintain its data, and includes random-access memory (RAM), dynamic random-access memory (DRAM), or synchronous dynamic random-access memory (SDRAM), among others. Non-volatile memory can retain stored data when not powered, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is a type of non-volatile memory that is characterized as byte addressable low latency memory. Examples of persistent memory may include Non-volatile Dynamic Inline Memory Modules (NVDIMM), phase-change memory, storage class memory, and the like.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, various embodiments discussed in the present document.

FIG. 5 is a flow diagram of a method performed by a distributed computing system, in accordance with some examples described herein.

DETAILED DESCRIPTION

Embodiments of the present disclosure are directed to Fabric Attached Memory (FAM) devices. FAM devices are connected to a computer system by a system-wide fabric. Communication among the devices using the switch fabric can have higher latency than direct memory connection.

Figure 1:
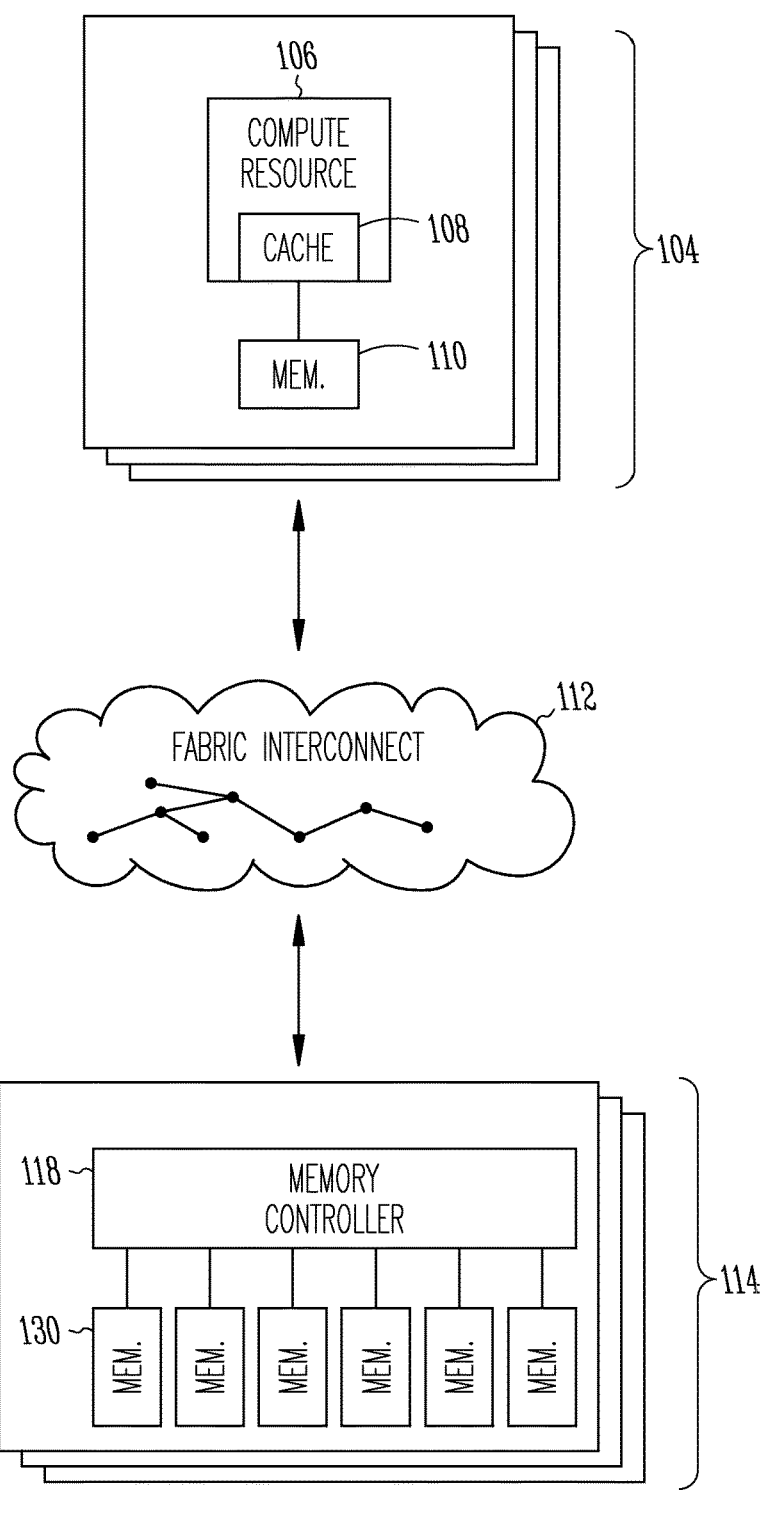
FIG. 1 is an example of a distributed computing system, in accordance with some examples described herein.

FIG. 1 shows an example of a distributed computing system for performing complex tasks autonomously in real time. The system 100 includes multiple host nodes 104 that include compute resources 106 and memory directly connected to the compute resource 106 to perform tasks or subtasks assigned to the host node 104. A compute resource 106 includes processing circuitry (e.g., a central processing unit (CPU), graphics processing unit (GPU), FPGA, etc.), and the memory may include cache memory 108 and other memory 110 that can be volatile or non-volatile. The memory directly connected to the compute resources 106 is high bandwidth memory that provides memory access with high bandwidth and low latency.

In distributed computing systems it is desired for system resources to share data. The host nodes 104 can communicate using a data fabric interconnect 112 or switch fabric (e.g., Gen-Z, Peripheral Component Interconnect Express (PCIe), Compute Express Link (CXL), etc.) and the host nodes 104 may cooperate to perform a complex task with functions of the task or subtasks assigned to one or more of the host nodes 104. The system 100 includes a fabric attached memory system that includes one or more memory devices 114 that are remote or disaggregated from the host nodes 104. Data stored in the memory devices 114 is accessed using a switch protocol to bring the data over the fabric interconnect 112.

Figure 2:
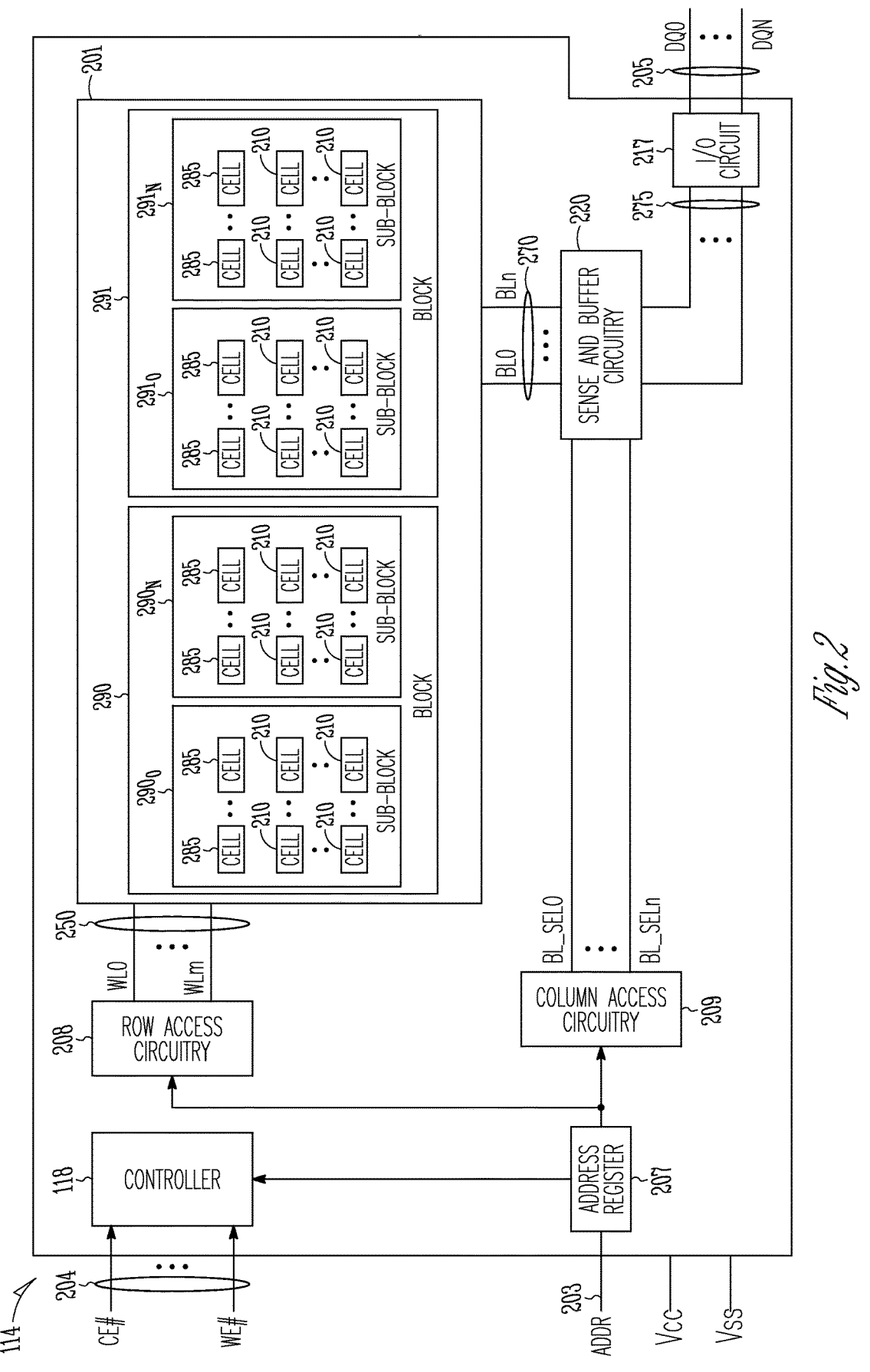
FIG. 2 is a block diagram of an example of a memory device, in accordance with some examples described herein.

FIG. 2 is a block diagram of an example memory device 114 suitable for use as memory device 114 in FIG. 1. The memory device 114 can include non-volatile memory cells having mixed memory cell types integrated in the same integrated circuit (IC) die, according to some examples described herein. Memory device 114 can include a memory array (or multiple memory arrays) 201 containing memory cells 210 and 285. In the physical structure of memory device 114, memory cells 210 and 285 can be arranged vertically (e.g., stacked over each other) over a substrate of memory device 114 (e.g., a semiconductor substrate of an IC die that includes memory cells 210 and 285). Memory cells 210 and 285 can include non-volatile cells. Memory cells 210 and 285 can have different non-volatile memory cell types. For example, memory cells 210 can include floating gate memory cells, charge trap memory cells, or other types of non-volatile memory cells. Memory cells 285 can include ferroelectric memory cells, phase change memory cells, resistive memory cells, conduction bridge memory cells, and spin-transfer-torque magnetic random access memory (STT-MRAM) cells, or other types of non-volatile memory cells.

As shown in FIG. 2, memory cells 210 and 285 can be arranged in blocks (memory cell blocks), such as blocks 290 and 291. Each of blocks 290 and 291 can include sub-blocks. For example, block 290 can include sub-blocks $290_0$ and $290_n$, and block 291 can include sub-blocks $291_0$ and $291_n$. Each of sub-blocks $290_0$, $290_n$, $291_0$, and $291_n$ can include a combination of memory cells 210 and 285. FIG. 2 shows memory device 200 having two blocks 290 and 291 and two sub-blocks in each of the blocks as an example. Memory device 200 can have more than two blocks and more than two sub-blocks in each of the blocks. The memory cells 210 and 285 of the memory array 201 can be included in multiple IC memory dies (e.g., memory dies 130 in FIG. 1).

Memory device 114 can include access lines (which can include word lines) 250 and data lines (which can include bit lines) 270. Access lines 250 can carry signals (e.g., word line signals) WL0 through WLm. Data lines 270 can carry signals (e.g., bit line signals) BL0 through BLn. Memory device 200 can use access lines 250 to selectively access sub-blocks 290$_0$, 290$_n$, 291$_0$, and 291$_n$ of blocks 290 and 291 and data lines 270 to selectively exchange information (e.g., data) with memory cells 210 of blocks 290 and 291.

As shown in FIG. 2, memory device 114 can include an address register 207 to receive address information (e.g., address signals) ADDR on lines (e.g., address lines) 203. Memory device 114 can include row access circuitry 208 and column access circuitry 209 that can decode address information from address register 207. Based on decoded address information, memory device 114 can determine which memory cells 210 of which sub-blocks of blocks 290 and 291 are to be accessed during a memory operation. Memory device 114 can perform a read operation to read (e.g., sense) information (e.g., previously stored information) in memory cells 210, or a write (e.g., program) operation to store (e.g., program) information in memory cells 210. Memory device 114 can use data lines 270 associated with signals BL0 through BLn to provide information to be stored in memory cells 210 or obtain information read (e.g., sensed) from memory cells 210. Memory device 114 can also perform an erase operation to erase information from some or all of memory cells 210 of blocks 290 and 291.

Memory device 114 includes a memory controller 118. Memory controller 118 can include processing circuitry components such as a processor, a state machine (e.g., finite state machine), register circuits, and other components configured to control memory operations (e.g., read, write, and erase operations) of memory device 114 based on control signals on lines 204. Examples of the control signals on lines 204 include one or more clock signals and other signals (e.g., a chip enable signal CE #, a write enable signal WE #) to indicate which operation (e.g., read, write, erase operation, erase-verify operation) memory device 114 can perform. The memory controller 118 can be included in the same integrated circuit chip as the memory cells. In some examples, the memory cells are NAND memory cells included in an integrated circuit die and the memory controller 118 is included in the same integrated circuit die as the NAND memory cells.

Memory device 200 can include sense and buffer circuitry 220 that can include components such as sense amplifiers and page buffer circuits (e.g., data latches). Sense and buffer circuitry 220 can respond to signals BL_SEL0 through BL_SELn from column access circuitry 209. Sense and buffer circuitry 220 can be configured to determine (e.g., by sensing) the value of information read from memory cells 210 (e.g., during a read operation) of blocks 290 and 291 and provide the value of the information to lines (e.g., global data lines) 275. Sense and buffer circuitry 220 can also be configured to use signals on lines 275 to determine the value of information to be stored (e.g., programmed) in memory cells 210 of blocks 290 and 291 (e.g., during a write operation) based on the values (e.g., voltage values) of signals on lines 275 (e.g., during a write operation).

Memory device 114 can include input/output (I/O) circuitry 217 to exchange information between memory cells 210 of blocks 290 and 291 and lines (e.g., I/O lines) 205. Signals DQ0 through DQN on lines 205 can represent information read from or stored in memory cells 210 of blocks 290 and 291. Lines 205 can include nodes within memory device 114 or pins (or solder balls) on a package where memory device 200 can reside. Other devices external to memory device 114 (e.g., an external memory controller, or a processor) can communicate with memory device 114 through lines 203, 204, and 205.

Memory device 114 can receive a supply voltage, including supply voltages Vcc and Vss. Supply voltage Vss can operate at a ground potential (e.g., having a value of approximately zero volts). Supply voltage Vcc can include an external voltage supplied to memory device 114 from an external power source such as a battery or alternating current to direct current (AC-DC) converter circuitry.

Each of memory cells 210 can be programmed individually or collectively to one or a number of programmed states. For example, a single-level cell (SLC) can represent one of two programmed states (e.g., 1 or 0), representing one bit of data. However, flash memory cells can also be multi-level cells (MLCs) that represent one of more than two programmed states, allowing the manufacture of higher density memories without increasing the number of memory cells, as each cell can represent more than one binary digit (e.g., more than one bit).

In another example, each of memory cells 210 can be programmed to store information representing a value for multiple bits, such as one of four possible values "00", "01", "10", and "11" of two bits, one of eight possible values "000", "001", "010", "011", "100", "101", "110", and "111" of three bits, or one of other values of another number of multiple bits. A cell that has the ability to store multiple bits is sometimes called a multi-level cell (or multi-state cell). MLC is used herein in its broader context, to refer to any memory cell that can store more than one bit of data per cell (i.e., that can represent more than two programmed states, including a triple-level cell (TLC) can refer to a memory cell that can store three bits of data per cell (e.g., one of eight programmed states), and a quad-level cell (QLC) can store four bits of data per cell).

Memory device 114 can include a non-volatile memory device, such that memory cells 210 and 285 can retain information stored thereon when power (e.g., voltage Vcc, Vss, or both) is disconnected from memory device 114. For example, memory device 114 can be a flash memory device, such as a NAND flash (e.g., 3-dimensional (3-D) NAND) or a NOR flash memory device, or another kind of memory device, such as a variable resistance memory device (e.g., a phase change memory device or a resistive RAM (Random Access Memory) device). One skilled in the art may recognize that memory device 114 may include other components not shown in FIG. 2 so as not to obscure the example embodiments described herein.

Figure 3:
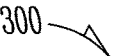
FIG. 3 is a block diagram of portions of an example of a fabric attached shared memory system, in accordance with some examples described herein.

FIG. 3 is a block diagram of portions of an example of a fabric attached shared memory system 300 that can be used in the distributed computing system of FIG. 1. FIG. 3 shows that the system 300 includes a memory device 114, such as the memory devices in the examples of FIG. 1 and FIG. 2. The memory system 300 includes multiple memory devices although only one memory device 114 is shown in FIG. 3 for simplicity of the diagram.

The memory device 114 includes a memory array included in multiple integrated circuit (IC) memory dies (130-A, . . . 130-N). The memory device 114 also includes a memory controller 118 that includes a memory die interface 326 and a fabric interface 328 to fabric interconnect 112 (e.g., a switch fabric) connecting the memory devices to the host nodes. The memory controller 118 includes processing circuitry and other logic circuitry that includes an IC die level error detection component and a device level error detection component.

The IC die level error detection component detects and may correct errors in an individual IC die. The example memory controller 118 of FIG. 3 includes an error detection engine 330 as the IC die level error detection component. The error detection engine 330 may detect and/or correct errors associated with writing data to or reading data from one or more memory cells of the memory array. As an example intended to be non-limiting, the error detection engine 330 may use error correction code (ECC) data to detect and correct errors. The memory controller 118 may be configured to actively detect and recover from error occurrences (e.g., bit errors, operation errors, etc.) associated with various operations or storage of data using the ECC data. ECC enables the memory controller 118 to maintain integrity of the data in the memory object. Part of this integrity maintenance may include removing (e.g., retiring) failing memory resources (e.g., memory cells, memory arrays, pages, blocks, planes, etc.) to prevent future errors. The error detection engine 330 may use a lower overhead error detecting technique such as error detecting codes (EDC) that do not correct errors. In some examples, the error detection engine 330 is configurable to one of ECC or EDC.

The device level error detection component of the memory controller 118 (e.g., the chipkill controller 332 of FIG. 3) corrects errors when an entire IC die fails. The chipkill controller 332 may distribute ECC data symbols among multiple IC memory die. The ECC data symbols may include Reed-Solomon (RS) codes, Hamming codes or Bose, Chaudhuri, and Hocquenghem (BCH) codes. Distributing the ECC symbol data allows the memory data to be reconstructed despite the failure of one entire IC memory die. In some examples, the memory device includes a spare IC memory die, and the chipkill controller 332 may replace a failed IC memory die with a spare IC memory die.

The memory system 300 also includes a system level error detection component to manage memory device replication and correct errors when an entire memory device 114 fails. In the example of FIG. 3, the system level error detection component is a redundant array of independent disk (RAID) controller 334. Other examples of the system level error detection component include a redundant array of independent memory (RAIM) controller, or a software component that provides a reliable memory object store (e.g., Apache Spark™). The system level error detection component may employ data replication across multiple memory devices 114 to handle failure of a complete memory device 114. The system level error detection can be managed using a host node 104 or a fabric manager 336 of the fabric interconnect 112.

The shared memory system 300 has tiered levels of reliability features that provide different levels of reliability for the system. In the example of FIG. 3, the system includes reliability features to resolve failures at the sub-IC die level, the IC die level, and the memory device level.

Different software applications running on the distributed computer system may have different reliability requirements. Multiple system components contribute to overall failure rates and have configurable reliability features. It is possible to coordinate system component configuration, driven by software needs, to reach a configuration with the target reliability level. However, reliability requirements can cost energy, performance, and memory capacity. Not having strong enough reliability features enabled can result in missing the reliability requirements, while significantly exceeding the reliability requirements adds performance and energy costs to the system. To find the right balance of system reliability and system performance, the configuration of the memory devices and switch fabric to provide one or more of error detection, error correction, data redundancy, data replication, etc., can be coordinated according to a specified target reliability for an application running on the computing system or its data.

Driven by application-specified requirements, a specific combination of reliability features can be activated (such as a combination of memory device ECC (e.g., RAID or Erasure Coding) and in-device ECC (e.g., Chipkill)) that reduces energy or resources and yet provides the desired performance. The system level error detection component and the memory controllers 118 of the multiple memory devices receive commands to allocate a memory address range to a memory object for an application and selectively activate one or more of the IC die level error detection components, the memory-device level error detection components, and the system level error detection components for the memory address range. Different memory address ranges can be configured with different combinations of reliability features.

Figure 4:
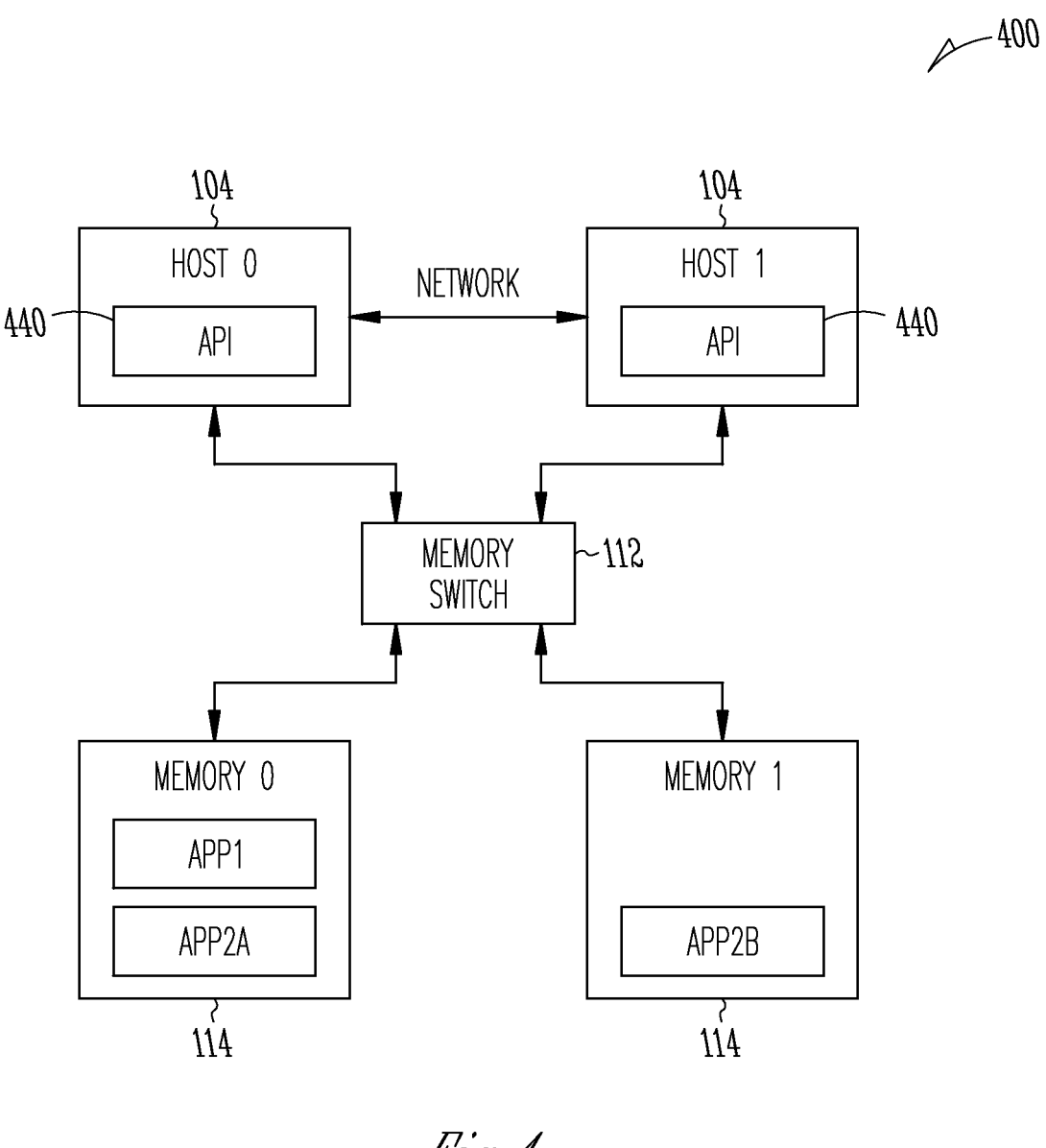
FIG. 4 is a block diagram of an example of portions of a distributed computing system, in accordance with some examples described herein.

FIG. 4 is a block diagram of an example of portions of a distributed computing system 400 having a shared memory comprised of disaggregated memory devices. The system 400 multiple host nodes 104 connected to multiple memory devices 114 by a switch fabric 112. Only two host nodes 104 and two memory devices 114 are shown for simplicity of the diagram. An actual implementation may have dozens of host nodes, memory switches and memory devices.

FIG. 5 is a flow diagram of a method 500 performed by a distributed computing system that includes multiple host nodes and memory devices. The method 500 can be performed using the distributed computing system of FIG. 4. The host nodes 104 of the system 400 of FIG. 4 include an application program interface (API) 440. At block 505 in FIG. 5, the API 440 of a host node receives a function call from a client application (or application) running on the host node 104. The function call is used to configure a data object in the memory to be used for operations by the application. The function call to the API includes a pointer to the memory object and a level of reliability for operations involving the memory object. The API 440 can be included in a reliability library.

An example of the function call is

SetMaximumFIT(pObject,FIT)

where pObject is a pointer to the memory object, and FIT specifies a maximum failures-in-time (FIT) for the memory object pointed to by pObject. The example in FIG. 4 shows two memory objects. One memory object for application APP1 and one memory object for APP2. The memory object for APP1 is allocated to memory device Memory 0, and the memory object for APP2 extends (as APP2A, APP2B) across memory devices Memory 0 and Memory 1. The runtime or memory management library configures the physical address space for the memory objects, so the size of the memory object pointed to by pObject would determine how many memory devices 114 it is stripped (interleaved) across.

Returning to FIG. 5 at block 510, the reliability features included in one or both of the fabric interconnect and memory devices of the main memory are configured according to the level of reliability in the function call. To configure the reliability features of the memory for the memory object, in some examples the API sends commands to the fabric interconnect 112 and the memory controllers 118 of the memory devices 114 in response to the function call. The commands activate one or more system reliability features for the memory object to meet the reliability requirement specified in the function call. In some examples, the API sends the reliability requirement to the fabric manager (e.g., fabric manager 336 in FIG. 3) and the fabric manager sends the commands to configure the system reliability features.

An example of a command is

ConfigureECC(pObject,RAID_mode)

where pObject is the pointer to the memory object and RAID_mode specifies a RAID mode (e.g., data mirroring or one of the other RAID parity modes) for the RAID controller 334 of the system to operate in. A different set of reliability features can be enabled for each of memory objects APP1 and APP2. For example, memory for APP1 may be config- ured to have some in-device ECC enabled on the address range and memory for APP2 may be configured to have RAID (e.g., replication or parity striping) applied to the memory by a controller of a host node 104 or logic in the fabric interconnect 112. When the reliability features are configured for the memory object of the application, the application operates as normal with the configured memory address region.

Figure 6A:
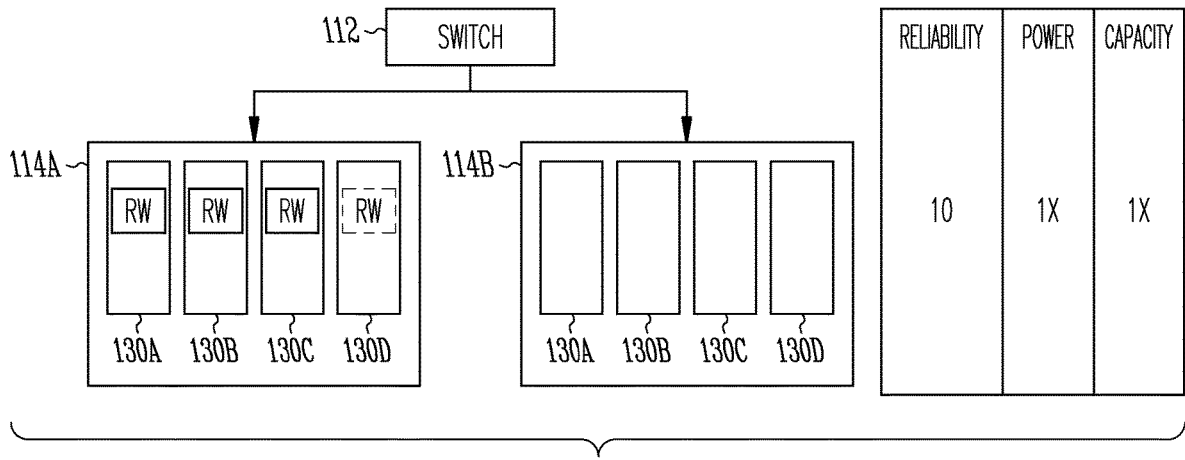
FIGS. 6A-6C illustrate example configurations of reliability features for memory systems, in accordance with some examples described herein.
Figure 6B:
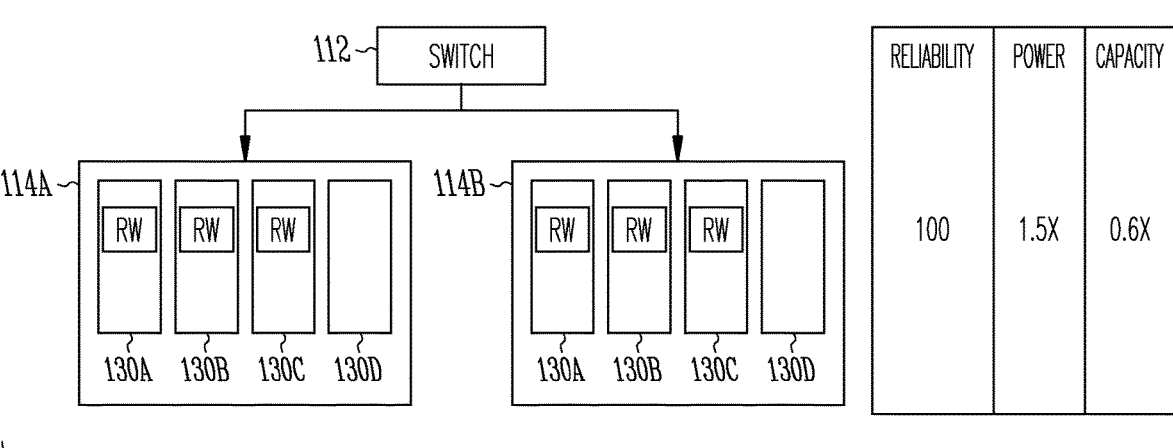
Figure 6C:
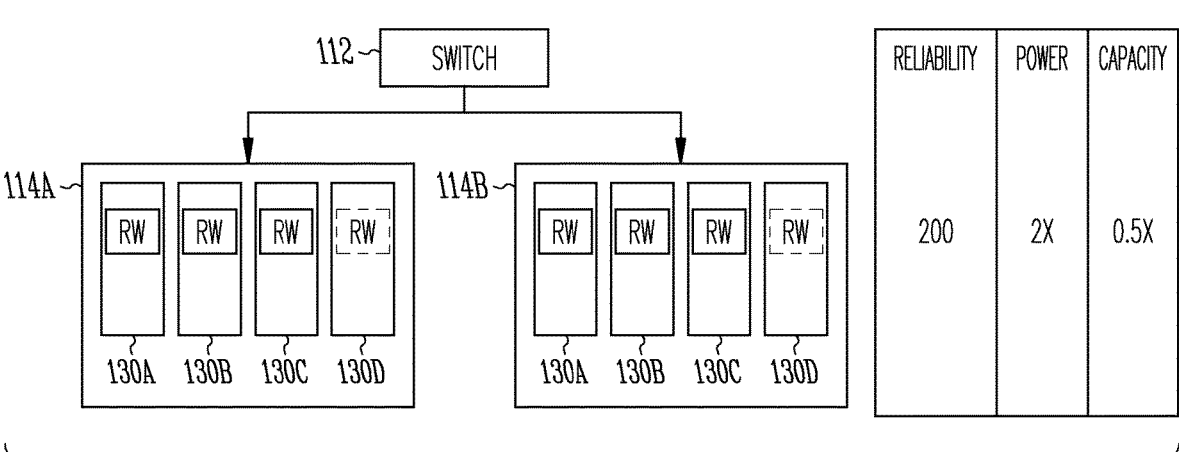

FIGS. 6A-6C illustrate three example configurations for reliability features for a memory system including a switch fabric 112 and two memory devices 114A, 114B. The configurations are based on the desired level of reliability for the memory operations for the memory objects of the memory devices 114. Each memory device 114A, 114B includes a memory controller (not shown) and multiple memory dies 130A-130D. The memory dies store read/write (RW) data. In FIG. 6A, memory device 114A is configured with die-level ECC (e.g., chipkill) for a memory object (indicated by the RW data within the dashed line box) allocated to memory die 130D. In FIG. 6B, memory device 114A is configured with data replication for a memory object (indicated by the RW data within the solid lined boxes) allocated to memory dies 13A, 13B, and 130C, and the logic of the fabric interconnect makes a copy of memory device 114A in memory device 114B. Die level ECC is not used in FIG. 6B. In FIG. 6C, both die-level ECC and data replication are configured for the memory object.

To the right of FIGS. 6A-6C are columns showing the relative reliability level for the different configurations of reliability features and the relative power consumption and memory capacity for the configurations. The numbers in the columns show that reliability increases as more reliability features are activated, and power consumption increases and memory capacity decreases as more reliability features are activated. Each application sharing a common hardware platform may have different reliability requirements, result- ing in different relative power consumption and relative memory capacity for the memory operations on the memory objects of the applications. The configuration examples in FIGS. 6A-6C are only examples and other configurations are possible. For instance, the reliability from replication is high in FIG. 6C. The reliability requirements of the application for FIG. 6C may be met by disabling the chipkill controller 332 in memory controller 114A and using a lower overhead approach such as only using error detection (e.g., protection with cyclic redundancy codes, or CRC), saving energy and freeing up memory capacity.

A lookup table can be used to map reliability targets for the memory objects to the system reliability features. Table 1 below is an example of a lookup table. The example is for the simplified system 400 of FIG. 4 in that only two memory devices 114 are included in the Table to configure two memory objects APP1 and APP2. An actual implementation may include configurations for several memory devices in the lookup table and be used to configure the several memory devices 114 for memory objects called by the applications of several host nodes 104.

TABLE 1

| FIT | Fabric Switch Configuration | Memory Device A Configuration | Memory Device B Configuration |
|---|---|---|---|
| >100000 | None | None | None |
| 1000 | None (normal) | Chipkill | Chipkill |
| 100 | RAID/Mirroring | Error detect only | Error detect only |
| 10 | RAID/Mirroring | Chipkill | Chipkill |

The lookup table identifies selectable combinations of reliability features corresponding to the "next highest" reli- ability setting that satisfies the reliability requirement speci- fied in the function call by the application. Using the "next highest" reliability setting that meets the reliability needs, ensures that memory configuration does not significantly exceed the reliability requirements, thereby avoiding system costs due to static over-provisioning features for error detec- tion and correction.

The combinations are indexed in the table by the level of reliability. In Table 1, reliability is specified as failures-in- time (FIT) which may be the number of failures in one billion hours of operation. FIT is just an example, and reliability in the lookup table could be specified using other reliability measures, such as annual failure rate (AFR) for example. Based on the reliability specified in the function call, the API can send commands to configure the reliability features identified using the lookup table. Higher reliability (or lower FIT) configures more error detection components of the tiered reliability features of the memory system. If the indicated reliability is low enough, none of the error detec- tion components may be activated, as indicated by the top row of the lookup table.

The lookup table may be stored in memory 110 of the host nodes 104 or in main memory. The lookup table could be written into memory by a fabric manager and the entries of the lookup table may be recurrently populated by the fabric manager. This may be desirable because the fabric manager has visibility of the system topology that may change over time. The API can read the lookup table and be notified of any system changes. Alternatively, the lookup table is used by the fabric manager that sends the commands in response to a request from the API.

The systems, devices, and methods described herein coor- dinate system components, driven by software needs, to reach a system configuration with a target reliability level that can be set by the software. Overall computing system performance, energy and reliability is improved by tailoring system configurations to software application requirements.

Figure 7:
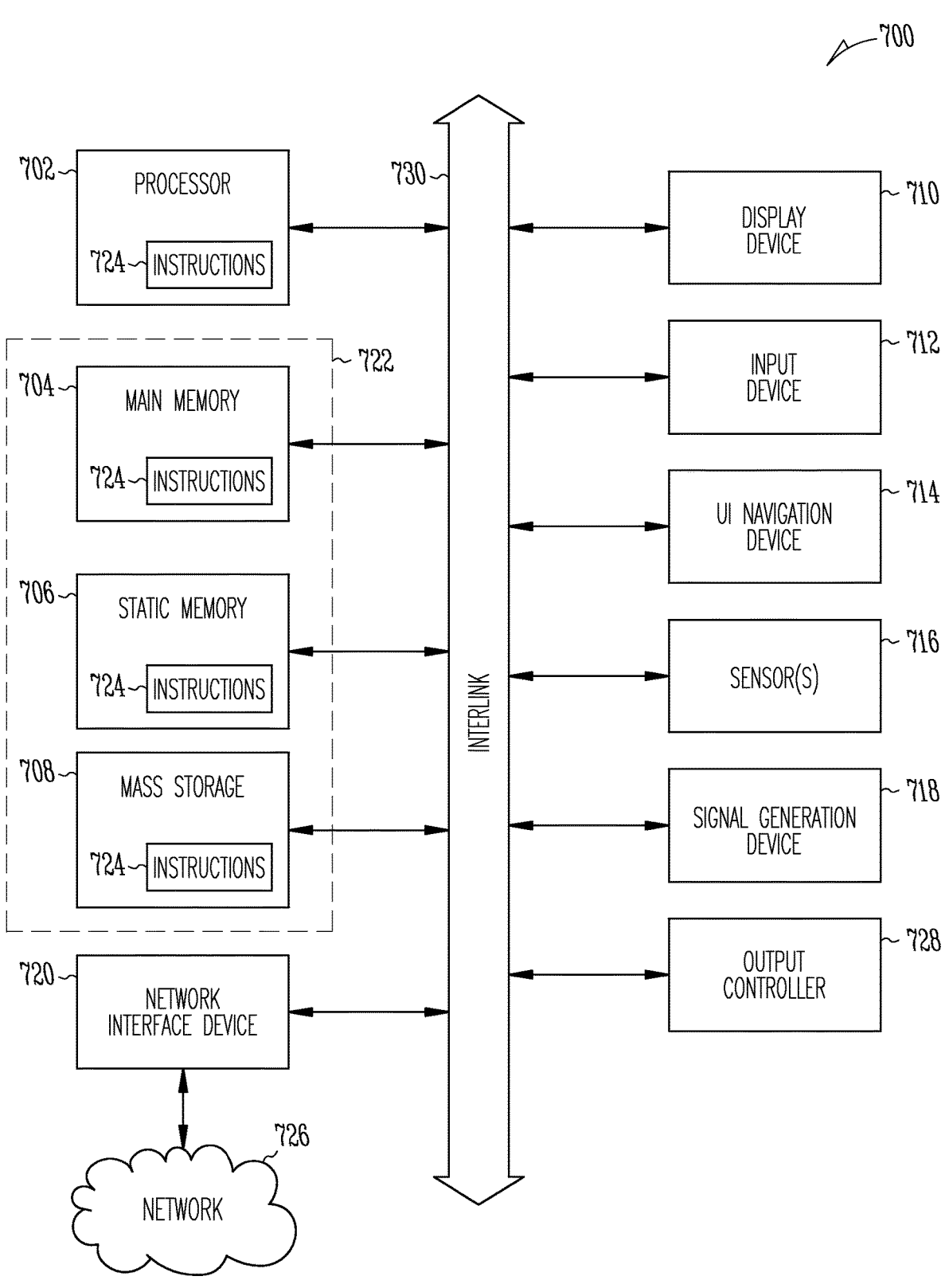
FIG. 7 illustrates a block diagram of an example machine, in accordance with some examples described herein.

FIG. 7 illustrates a block diagram of an example machine 700 upon which any one or more of the techniques (e.g., methodologies) described herein may be performed. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed par- ticles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation.

Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drives, tape drives, flash storage, or other block devices) some or all of which may communicate with each other via an interlink (e.g., bus) 730. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 may be, or may include, a machine readable medium 722 on which is stored one or more sets of data structures or instructions 724 (e.g., software) embodying or utilized by any one or more of the techniques or functions described herein. The instructions 724 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine-readable media 722. While the machine-readable medium 722 is illustrated as a single medium, the term "machine readable medium" may include a single medium or multiple media (e.g., a centralized or distributed database, and/or associated caches and servers) configured to store the one or more instructions 724.

The term "machine-readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 722 may be representative of the instructions 724, such as instructions 724 themselves or a format from which the instructions 724 may be derived. This format from which the instructions 724 may be derived may include source code, encoded instructions (e.g., in compressed or encrypted form), packaged instructions (e.g., split into multiple packages), or the like. The information representative of the instructions 724 in the machine readable medium 722 may be processed by processing circuitry into the instructions to implement any of the operations discussed herein. For example, deriving the instructions 724 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 724.

In an example, the derivation of the instructions 724 may include assembly, compilation, or interpretation of the information (e.g., by the processing circuitry) to create the instructions 724 from some intermediate or preprocessed format provided by the machine readable medium 722. The information, when provided in multiple parts, may be combined, unpacked, and modified to create the instructions 724. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 724 may be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

In the foregoing specification, some example implementations of the disclosure have been described. It will be evident that various modifications can be made thereto without departing from the broader scope and spirit of the disclosure as set forth in the following claims. The specification and drawings are, accordingly, to be regarded in an illustrative sense rather than in a restrictive sense. Below is a non-exhaustive list of examples of implementations of the present disclosure.

Example 1 includes subject matter (such as a method performed by a distributed computing system that includes one or more host nodes and a main memory connected to the one or more host nodes by a fabric interconnect) including receiving, by an application program interface (API) of a host node, a function call from an application of a host device, the function call including a pointer to a memory object and a level of reliability for operations involving the memory object; and configuring system reliability features included in one or both of the fabric interconnect and memory devices of the main memory according to the level of reliability in the function call.

In Example 2, the subject matter of Example 1 optionally includes the API sending one or more commands to one or more memory controllers of the memory devices to configure the system reliability features.

In Example 3, the subject matter of one or both of Examples 1 and 2 optionally includes the API sending one or more commands to a fabric manager of the system to configure the system reliability features.

In Example 4, the subject matter of one or any combination of Examples 1-3 optionally includes enabling one or more system reliability features selectable from among at least one reliability feature internal to an integrated circuit (IC) die of a memory device of the main memory, at least one reliability feature internal to the memory device and including multiple IC die of the memory device, and at least one reliability feature including more than one memory device of the main memory.

In Example 5, the subject matter of one or any combination of Examples 1-4 optionally includes indexing a lookup table stored in the main memory using the level of reliability to identify the system configuration features to enable to achieve the level of reliability.

In Example 6, the subject matter of Example 5 optionally includes selecting from the lookup table entries to selectively activate one or more of an error detection component of a memory device, a chipkill controller of a memory device, and a redundant array of independent disk (RAID) controller according to the indicated level of reliability.

In Example 7, the subject matter of one or both of Examples 5 and 6 optionally includes selecting from the lookup table an entry to select no error protection for the memory object.

In Example 8, the subject matter of one or any combination of Examples 5-7 optionally includes writing the lookup table into memory using a fabric manager of the system.

In Example 9, the subject matter of one or any combination of Examples 1-8 optionally includes receiving, by the API, multiple function calls from multiple applications; and configuring different reliability features for different address ranges of the same memory device according to levels of reliability in the function calls.

In Example 10, the subject matter of Example 9 optionally includes configuring a first address range of the memory device with IC die level error detection according to a first level of reliability included in a first function call; and configuring a second address range of the memory device with memory device level error detection according to a second level of reliability included in a second function call.

Example 11 includes subject matter (or can optionally be combined with any of Examples 1-10 to include such subject matter) such as a computer readable storage medium including instructions, that when performed by processing circuitry of a host node of a distributed computing system, cause the host node to perform operations. The operations including configuring a reliability library that includes an application program interface (API); receiving, by the API, a function call from a client application of the host node, the function call including a pointer to a memory object and a level of reliability for operations involving the memory object; and sending a command to configuring system reliability features included in one or both of a fabric interconnect of the distributed computing system and memory devices of a main memory of the distributed computing system according to the level of reliability in the function call.

In Example 12, the subject matter of Example 11 optionally includes a computer readable storage medium including instructions that cause the API to send one or more commands to the memory devices of the main memory to configure the system reliability features according to the level of reliability for the memory object.

In Example 13, the subject matter of Example 12 optionally includes a computer readable storage medium including instructions that cause the API to read a lookup table to identify the system reliability features corresponding to the level of reliability; and send the commands to activate the system reliability features identified from the lookup table.

In Example 14, the subject matter of one or any combination of Examples 11-13 optionally includes a computer readable storage medium including instructions that cause the API to send one or more commands to a fabric manager of the system to configure the system reliability features according to the level of reliability for the memory object.

Example 15 includes subject matter, such as a memory system of a distributed computer system (or can optionally be combined with one or any combination of examples 1-14 to include such subject matter), comprising multiple memory devices, a switch fabric coupled to the memory devices and a system level error detection component. The memory devices include multiple integrated circuit (IC) memory dies and a memory controller. The memory controller includes an IC die level error detection component to correct errors in a single IC die, and a device level error detection component to correct errors when an individual IC die fails. The system level error detection component manages memory device replication and correct errors when an entire memory device fails. The system level error detection component and the memory controllers of the multiple memory devices are configured to receive commands to allocate a memory address range to a memory object and selectively activate one or more of the IC die level error detection component, the memory-device level error detection component, and the system level error detection component for the memory address range.

In Example 16, the subject matter of Example 15, optionally includes a system level error detection component and memory controllers of the multiple memory devices configured to receive commands to allocate multiple address ranges to multiple a memory objects and activate different levels of error detection for the multiple address ranges.

In Example 17, the subject matter of one or both of Examples 15 and 16 optionally includes a system level error detection component and memory controllers of the multiple memory devices configured to receive commands to allocate a memory range from a fabric manager.

In Example 18, the subject matter of one or any combination of Examples 15-17 optionally includes a system level error detection component and memory controllers of the multiple memory devices are configured to receive the commands to allocate a memory address range from a host node.

In Example 19, the subject matter of one or any combination of Examples 15-18 optionally includes an IC die level error detection component that includes an error detection component, a memory-device level error detection component that includes a chipkill controller, and a system level error detection component includes a RAID controller.

In Example 20, the subject matter of one or nay combination of Examples 15-19 optionally includes a lookup table stored in memory that includes different combinations of the IC die level error detection components, the memory-device level error detection components, and the system level error detection components indexed according to level of reliability for the memory object.

These non-limiting Examples can be combined in any permutation or combination.

What is claimed is:

1. A method performed by a distributed computing system that includes one or more host nodes and a main memory connected to the one or more host nodes by a fabric interconnect, the method comprising:

receiving, by an application program interface (API) of a host node, a function call from an application of a host device, the function call including a pointer to a memory object and a level of reliability for operations involving the memory object;

identifying memory device reliability features included in memory devices of the main memory from a lookup table stored in the main memory that indexes the IC die level error detection components, the memory-device level error detection components, and a system level error detection component according to levels of reliability for the memory object; and enabling identified memory device reliability features according to the level of reliability in the function call.

2. The method of claim 1, wherein enabling the memory device reliability features includes the API sending one or more commands to one or more memory controllers of the memory devices to configure the system reliability features.

3. The method of claim 1, including configuring reliability features of the fabric interconnect and the API sending one or more commands to a fabric manager of the system to configure the reliability features of the fabric interconnect.

4. The method of claim 1, wherein enabling the memory device reliability features according to the level of reliability in the function call includes enabling one or more memory device reliability features selectable from among at least one reliability feature internal to an integrated circuit (IC) die of a memory device of the main memory, at least one reliability feature internal to the memory device and including multiple IC die of the memory device, and at least one reliability feature including more than one memory device of the main memory.

5. The method of claim 1, including selecting from the lookup table entries to selectively activate one or more of an error detection component of a memory device, a chipkill controller of a memory device, and a redundant array of independent disk (RAID) parity mode of a RAID controller according to the indicated level of reliability.

6. The method of claim 1, including selecting from the lookup table an entry to select no error protection for the memory object.

7. The method of claim 1, including writing the lookup table into memory using a fabric manager of the system.

8. The method of claim 1, including:

receiving, by the API, multiple function calls from multiple applications; and enabling different memory device reliability features for different address ranges of the same memory device according to levels of reliability in the function calls.

9. The method of claim 8, wherein enabling different memory device reliability features includes:

configuring a first address range of the memory device with IC die level error detection according to a first level of reliability included in a first function call; and configuring a second address range of the memory device with memory device level error detection according to a second level of reliability included in a second function call.

10. A non-transitory computer readable storage medium including instructions, that when performed by processing circuitry of a host node of a distributed computing system, cause the host node to perform operations including:

configuring a reliability library that includes an application program interface (API);

receiving, by the API, a function call from a client application of the host node, the function call including a pointer to a memory object and a level of reliability for operations involving the memory object;

identifying memory device reliability features included in memory devices of a main memory of the distributed computing system by reading a lookup table stored in memory that indexes the IC die level error detection components, the memory-device level error detection components, and a system level error detection component according to levels of reliability for the memory object; and sending a command to enable the identified memory device reliability features according to the level of reliability in the function call.

11. The non-transitory computer readable storage medium of claim 10, including instructions that cause the API to send one or more commands to the memory devices of the main memory to configure the memory device reliability features according to the level of reliability for the memory object.

12. The non-transitory computer readable storage medium of claim 10, including instructions that cause the API to send one or more commands to a fabric manager of the system to configure the reliability features of the memory object according to the level of reliability for the memory object.

13. A memory system of a distributed computing system, the memory system comprising:

multiple memory devices, each memory device including:

multiple integrated circuit (IC) memory dies; and a memory controller including:

an IC die level error detection component to correct errors in a single IC die; and a memory-device level error detection component to correct errors when an IC die fails;

a switch fabric coupled to the multiple memory devices; and a lookup table stored in memory that indexes the IC die level error detection components, the memory-device level error detection components, and a system level error detection component to levels of reliability for the memory object;

wherein the memory controllers of the multiple memory devices are configured to receive commands to allocate a memory address range to a memory object and selectively enable one or more of the IC die level error detection component and the memory-device level error detection component for the memory address range.

14. The memory system of claim 13, wherein the system level error detection component is configured to manage memory device replication and correct errors when an entire memory device fails and to enable an error detection mode of the system level error detection component for the memory address range; and wherein the system level error detection component and the memory controllers of the multiple memory devices are further configured to receive commands to allocate multiple address ranges to multiple a memory objects and activate different levels of error detection for the multiple address ranges.

15. The memory system of claim 14, wherein the system level error detection component and the memory controllers of the multiple memory devices are configured to receive the commands from a fabric manager.

16. The memory system of claim 14, wherein the system level error detection component and the memory controllers of the multiple memory devices are configured to receive the commands from a host node.

17. The memory system of claim 14, wherein the IC die level error detection component includes an error detection component, the memory-device level error detection component includes a chipkill controller, and the system level error detection component includes a redundant array of independent disk (RAID) parity mode of a RAID controller.

\* \* \* \* \*